United States Patent

Barone

(10) Patent No.: US 9,581,256 B2
(45) Date of Patent: Feb. 28, 2017

(54) VALVE FLAPPER SPRING STOP MECHANISM

(71) Applicant: Hamilton Sundstrand Corporation, Windsor Locks, CT (US)

(72) Inventor: Michael R. Barone, Amston, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 97 days.

(21) Appl. No.: 14/326,080

(22) Filed: Jul. 8, 2014

(65) Prior Publication Data

US 2016/0010757 A1  Jan. 14, 2016

(51) Int. Cl.
  *F16K 15/03* (2006.01)

(52) U.S. Cl.
  CPC ........ *F16K 15/038* (2013.01); *Y10T 137/7839* (2015.04); *Y10T 137/7898* (2015.04)

(58) Field of Classification Search
  CPC ............. F16K 15/038; Y10T 137/7898; Y10T 137/7839
  USPC .............................................. 137/512.1, 527
  See application file for complete search history.

(56) References Cited

U.S. PATENT DOCUMENTS

| | | | | |
|---|---|---|---|---|
| 3,026,901 A | * | 3/1962 | Wheeler, Jr. ............ | F16K 1/223 137/454.2 |
| 3,990,471 A | * | 11/1976 | Schutzer ............... | F16K 15/033 137/527 |
| 4,867,199 A | * | 9/1989 | Marx .................... | F16K 15/038 137/512.1 |
| 2004/0065370 A1 | * | 4/2004 | Gallego Buzon ..... | F16K 15/038 137/512.1 |
| 2007/0256740 A1 | * | 11/2007 | Sugai ................... | F16K 15/033 137/512.1 |
| 2008/0078458 A1 | | 4/2008 | Denike et al. | |
| 2013/0340862 A1 | * | 12/2013 | Kamp .................. | F16K 15/038 137/511 |

FOREIGN PATENT DOCUMENTS

EP  2249068 A2  11/2010
GB  2510064 A   7/2014

OTHER PUBLICATIONS

Search Report from GB Application Serial No. GB1511108.1, Dated Dec. 4, 2015, 3 pages.

* cited by examiner

*Primary Examiner* — Craig Schneider
*Assistant Examiner* — P. Macade Nichols
(74) *Attorney, Agent, or Firm* — Kinney & Lange, P.A.

(57) ABSTRACT

A check valve with a housing and a first flapper rotatable about an axis between open and closed positions includes a first spring mechanism operatively positioned between a static component and the first flapper. When the first flapper is in the closed position there is a distance between the first spring mechanism and either the static component or the first flapper.

8 Claims, 5 Drawing Sheets

VALVE FLAPPER SPRING STOP MECHANISM

BACKGROUND

The present embodiments relate to valves and, more particularly, to swing check valves.

A check valve is a type of valve that generally allows fluid to flow through the check valve in only one direction. A swing check valve utilizes at least one flapper or disc which rotates (i.e., pivots) about an axis between open and closed positions. When in the closed position, the flapper sits on a housing of the check valve and blocks a flow of fluid through the check valve. When the flow of fluid into the check valve reaches a sufficient pressure (i.e. the cracking pressure), the flapper opens by rotating about the axis. Swing check valves are generally designed for a specific cracking pressure depending on the application. When the fluid pressure drops below the cracking pressure and/or back pressure occurs, the flapper then rotates back to the closed position, preventing fluid from flowing back into the swing check valve.

SUMMARY

One embodiment includes a check valve with a housing and a first flapper rotatable about an axis between open and closed positions. Also included is a first spring mechanism operatively positioned between a static component and the first flapper. When the first flapper is in the closed position there is a distance between the first spring mechanism and either the static component or the first flapper.

Another embodiment includes a method for stopping rotation of a flapper of a check valve. The method includes rotating a first flapper from an interface of the first flapper and a housing of the check valve. A rotational velocity of the first flapper is decreased by deflecting a first spring mechanism with the first flapper at or near a location where the first flapper is desired to stop rotating.

Figure 1:
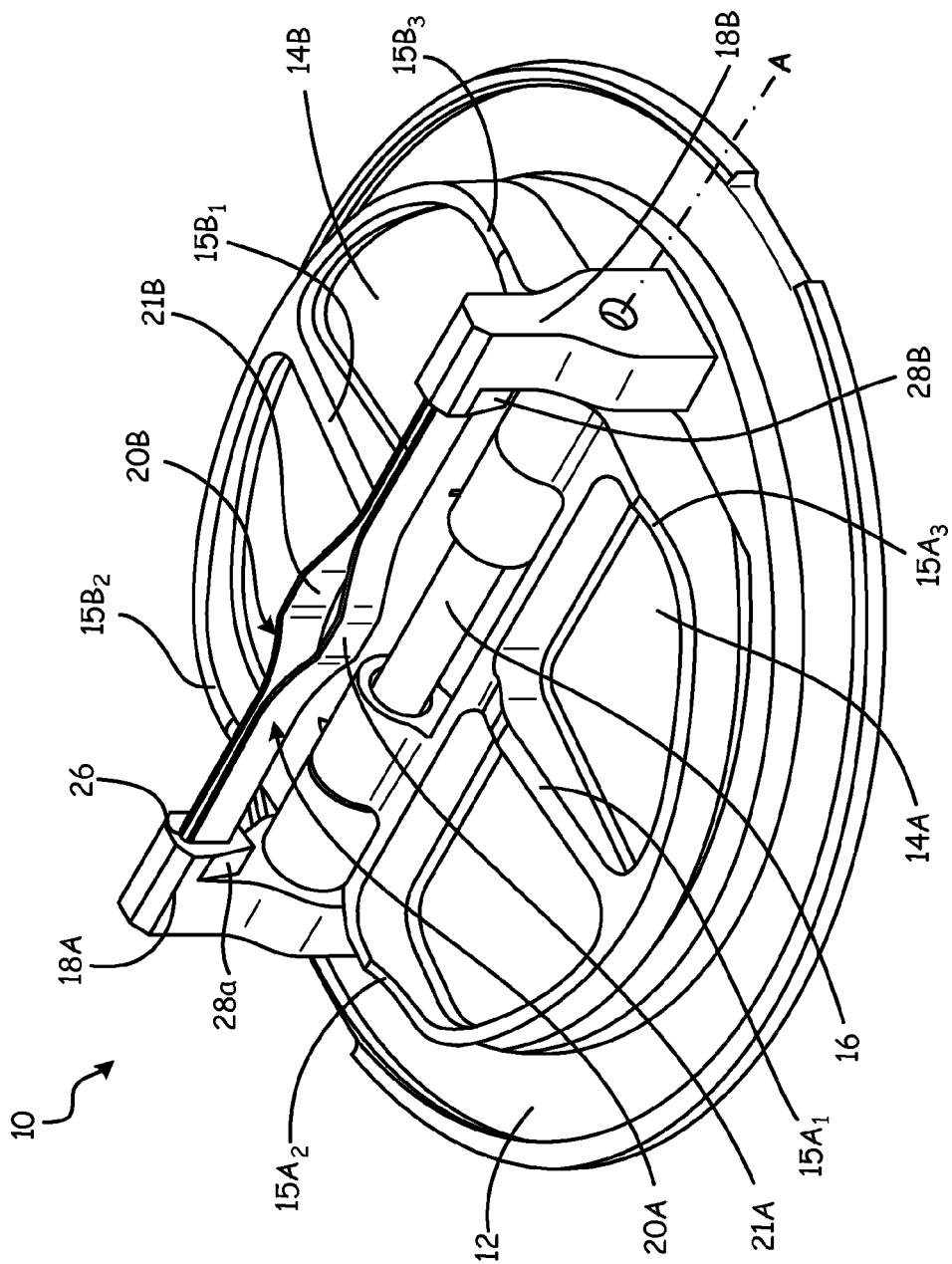
FIG. 1 is a perspective view of a swing check valve with two spring mechanisms.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present inventors have discovered flappers in prior swing check valves experience high impact loads when opening and, as a result, are imparted with significant stresses which may reduce the useful life of the flappers. The high impact loads on the flappers of prior swing check valves are due to the manner in which the flappers are stopped when opening. In prior swing check valves, when the flappers rotate to open, the rotation of the flapper is stopped by a metal stop pin or similar hard stop. Flappers are typically accelerated to a maximum rotational velocity just before impact with the hard stop, causing significant impact loads on the flappers. Further complicating matters, the use of non-metallic soft stops, such as rubber bumpers, for the flappers is impracticable in high temperature applications.

Generally, the present embodiments significantly reduce or eliminate impact loads on swing check valve flappers, prolonging the useful life of the flappers and thus the swing check valve itself. Impact loads on the flappers are significantly reduced or eliminated by utilizing a spring mechanism operatively positioned between a static component of the valve and a flapper.

FIG. 1 is a perspective view of swing check valve 10. Valve housing 12 defines a body of valve 10. When flappers 14A and 14B are in a closed position, as shown in FIG. 1, flappers 14A and 14B interface with housing 12 such that flappers 14A and 14B are seated on housing 12 and substantially block a flow of fluid through valve 10. However, when a flow of fluid (e.g. various fluids including gaseous, liquid, and multiphase) reaches a sufficient pressure (i.e. the cracking pressure), flappers 14A and 14B rotate about an axis A from the closed position to an open position (shown in FIGS. 2A and 2B), allowing fluid to pass through valve 10. In the illustrated embodiment, flappers 14A and 14B are rotatably attached to hinge pin 16 such that the axis A about which flappers 14A and 14B rotate is defined by hinge pin 16. However, in other embodiments the axis about which flappers 14A and 14B rotate can be any axis which allows the flappers 14A and 14B to rotate between open and closed positions, and the axis of rotation of each flapper 14A and 14B need not be a common axis. For example, in one embodiment flappers 14A and 14B can be rotatably attached to housing 12 on opposite ends of housing 12.

Flapper 14A includes ridges $15A_1$, $15A_2$, and $15A_3$ which extend in a direction radially out from, or perpendicular to, axis A. Flapper 14B includes ridges $15B_1$, $15B_2$, and $15B_3$ which extend in a direction radially out from, or perpendicular to, axis A.

Hinge pin 16 extends between posts 18A and 18B and is secured to post 18A on one end and post 18B on a second end. In the illustrated embodiment, posts 18A and 18B are individual components attached to and included on housing 12, but in another embodiment posts 18A and 18B can be formed integral with housing 12 by, for example, machining. Posts 18A and 18B each extend outward from a common surface or side of housing 12 in a same direction as shown in FIG. 1.

Spring mechanisms 20A and 20B can extend between posts 18A and 18B as shown in FIG. 1. When flappers 14A and 14B are in the closed position as shown in FIG. 1, there is a distance between spring mechanism 20A and flapper 14A as well as between spring mechanism 20B and flapper 14B. In the illustrated embodiment shown in FIG. 1, spring mechanisms 20A and 20B are each a single spring, and more specifically are each a single leaf spring. Spring mechanisms 20A and 20B each have a protrusion portion 21A and 21B respectively, which protrudes radially outward relative axis A. Protrusion portions 21A and 21B each protrude radially outward in opposite directions—portion 21A protrudes outward into a path of rotation of flapper 14A, while portion 21B protrudes outward into a path of rotation of flapper 14B such that when flappers 14A and 14B rotate to the open position flappers 14A and 14B first come into contact with portions 21A and 21B of spring mechanisms 20A and 20B. Spring mechanisms 20A and 20B can be, for example, stamped sheet metal which provides a cost savings benefit and the ability to use spring mechanisms 20A and 20B in high temperature applications. Spring mechanisms 20A and 20B can be made from stainless steel, beryllium, copper, or other common spring and/or metallic materials suitable for the particular application (e.g. operating environment) of valve 10.

Posts 18A and 18B are each examples of a static component of valve 10, and as such each spring mechanism 20A and 20B is operatively positioned between a static component and a movable flapper 14A or 14B. This means that when flapper 14A rotates, flapper 14A does not first come into contact with the static component, but rather flapper 14A first comes into contact with spring mechanism 20A (spring mechanism 20A protrudes out radially from an axis between posts 18A and 18B further than any part of posts 18A and 18B protrudes out radially from the same axis). In another embodiment, spring mechanism 20A can be operatively positioned between a static component and flapper 14B by positioning spring mechanism 20A on flapper 14A and installing a static component, such as a pin or bar, between posts 18A and 18B (i.e. in the location where spring mechanism is shown to be located in FIG. 1).

Figure 2A:
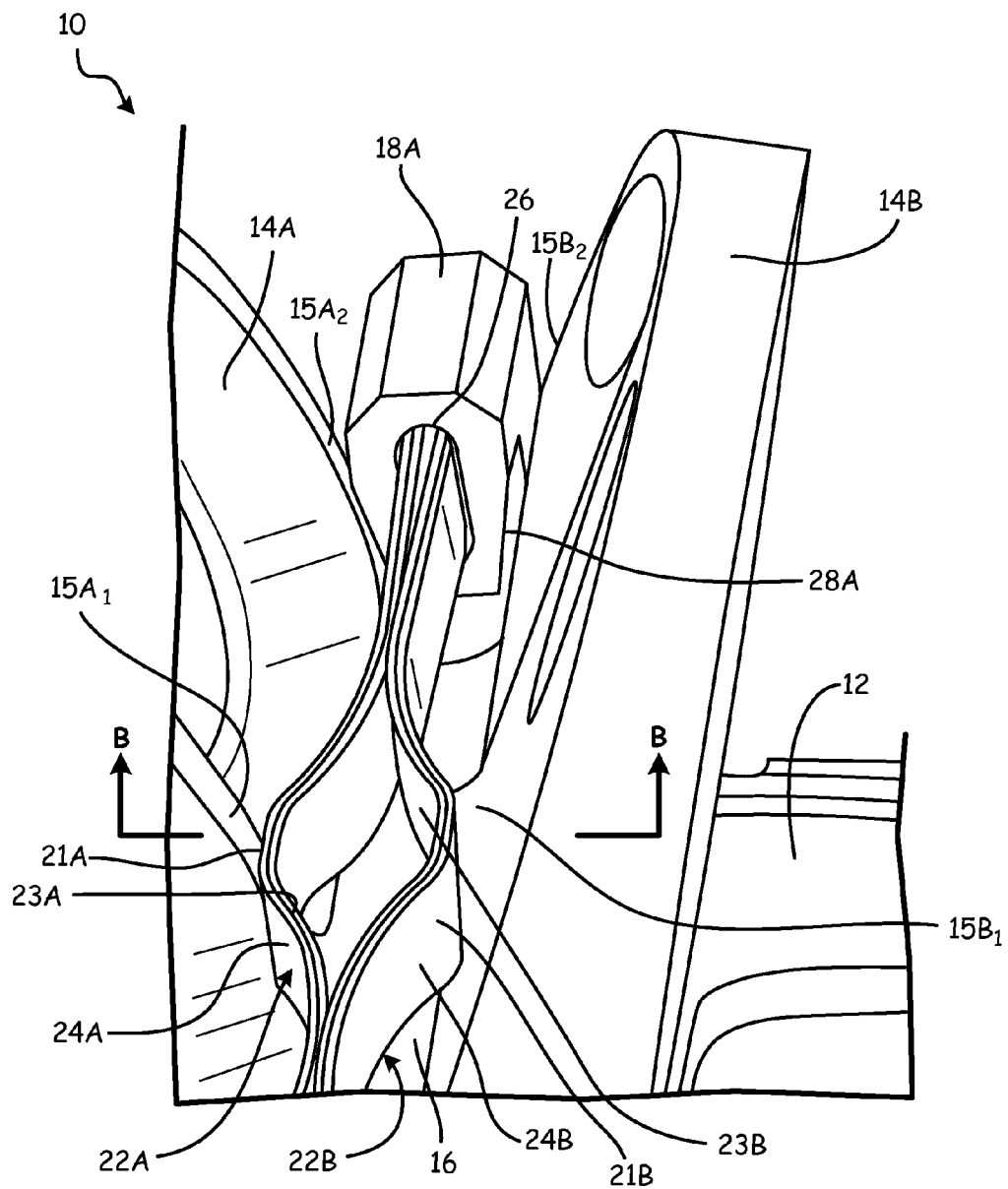
FIG. 2A is a perspective view of a portion of the swing check valve of FIG. 1 with the flappers rotated to an open position and the spring mechanisms comprising multiple springs in parallel.
Figure 2B:
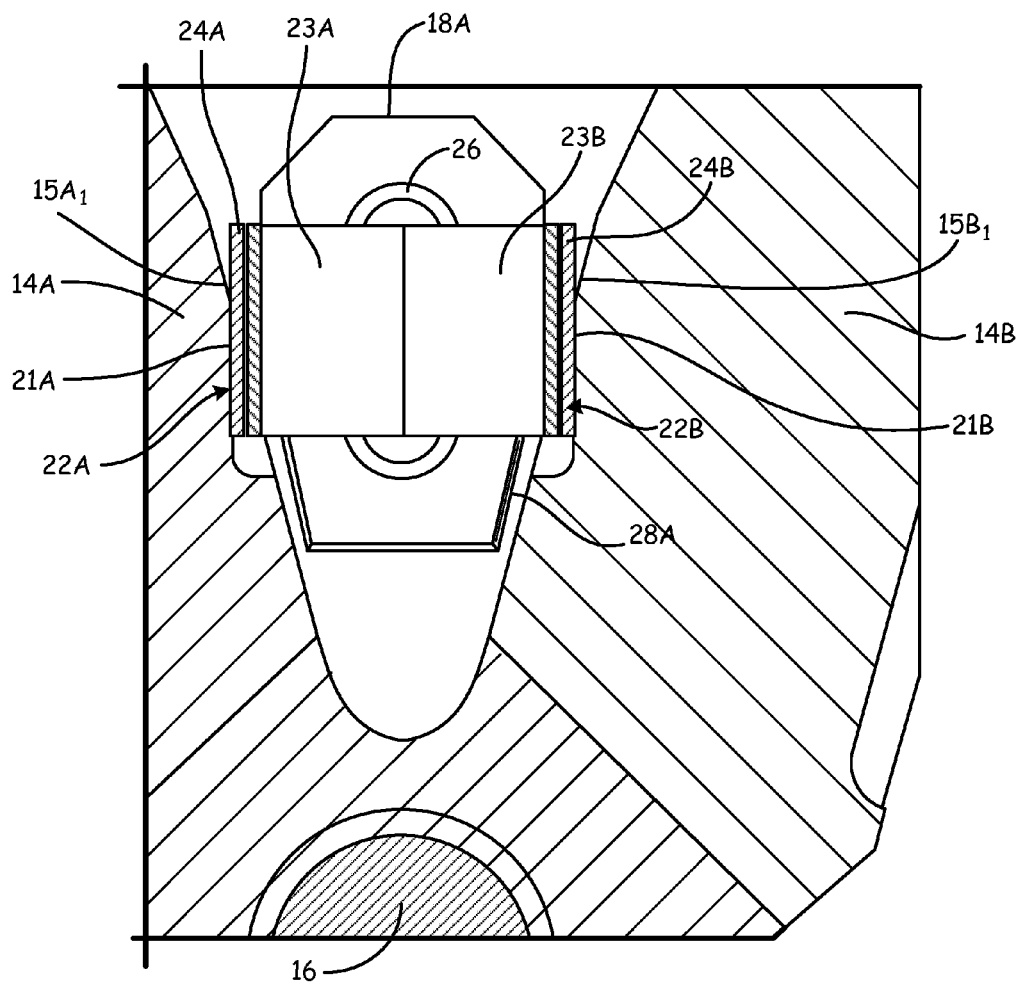
FIG. 2B is a cross-sectional view of the flappers contacting the spring mechanisms of FIG. 2A taken along line B-B.

FIGS. 2A and 2B show swing check valve 10 with flappers 14A and 14B rotated to the open position. FIG. 2A is a perspective view of a portion of valve 10, while FIG. 2B is a cross-sectional view of FIG. 2A taken along line B-B. However, unlike in FIG. 1 where spring mechanisms 20A and 20B are each a single spring, spring mechanisms 22A and 22B in FIGS. 2A and 2B are each two springs in parallel—spring mechanism 22A includes springs 23A and 24A in parallel, while spring mechanism 22B includes springs 23B and 24B in parallel. Two or more springs are in parallel (e.g., 23A and 24A) when the contouring of one spring is substantially aligned with the contouring of a second, closely adjacent spring such that the springs are configured in a generally stacked arrangement.

Post 18A includes slot 26 (post 18B also includes slot 26, but is not visible) within which one end of each of springs 23A, 23B, 24A, and 24B is located. In the embodiment shown in FIGS. 2A and 2B, both ends of each of springs 23A, 23B, 24A, and 24B are not physically coupled to posts 18A and 18B inside of slots 26, but rather are trapped between posts 18A and 18B at slots 26 and are thus inherently retained between posts 18A and 18B. Such a configuration of springs 23A, 23B, 24A, and 24B does away with any need to utilize mounting hardware and therefore provides cost savings and well as weight reduction of valve 10. Furthermore, trapping springs 23A, 23B, 24A, and 24B between posts 18A and 18B allows springs 23A, 23B, 24A, and/or 24B to be changed out easily and without disturbing posts 18A and 18B. Springs 23A, 23B, 24A, and 24B can be fit tightly enough within slots 26 such that springs 23A, 23B, 24A, and 24B do not move or shift around significantly within slot 26. The dimensions of slot 26 can correspond to the height and thickness of springs 23A, 23B, 24A, and 24B. In another embodiment springs 23A, 23B, 24A, and 24B can be coupled to posts 18A and 18B inside of slots 26 by any suitable attachment means.

When fluid attempting to pass through valve 10 reaches a sufficient pressure, flappers 14A and 14B swing open, rotating about an axis from the closed position (shown in FIG. 1) to an open position as shown. Flappers 14A and 14B reach a maximum rotational velocity immediately before coming into contact with spring mechanisms 22A and 22B respectively. As described previously, flapper 14A first comes into contact with portion 21A of spring mechanism 22A and flapper 14B first comes into contact with portion 21B of spring mechanism 22B. Specifically, in the illustrated embodiment, portion 21A is aligned to contact ridge $15A_1$ of flapper 14A and portion 21B is aligned to contact ridge $15B_1$ of flapper 14B. As flappers 14A and 14B come into contact with spring mechanisms 22A and 22B respectively at or near a location where flappers 14A and 14B are desired to stop rotating, spring mechanisms 22A and 22B deflect and dissipate kinetic energy of the flappers 14A and 14B (as heat). When spring mechanism 22A deflects, both springs 23A and 24A in parallel, which make up spring mechanism 22A, deflect. As compared to prior swing check valves which use hard stops to immediately terminate rotation of flappers 14A and 14B, spring mechanisms 22A and 22B of valve 10 reduce the rotational velocity of flappers 14A and 14B over a greater distance and time, thus resulting in significant stress reductions in flappers 14A and 14B. In other words, the nature of flapper 14A and 14B stopping is changed from impact loading to much slower deceleration, dramatically reducing stresses in flappers 14A and 14B. By reducing the stresses, and therefore wear, imparted on flappers 14A and 14B a useful life of flappers 14A and 14B is extended.

Additionally, the use of multiple springs in parallel, as in spring mechanisms 22A and 22B, creates friction between springs in parallel (e.g., springs 23A and 24A) which in turn creates dampening to dissipate energy at locations where springs 23A and 24A or springs 23B and 24B are touching. Dissipating energy through the use of springs in parallel avoids imparting what would otherwise be strain energy in flappers 14A and 14B, and therefore further increases the useful life of flappers 14A and 14B. Furthermore, the use of springs in parallel as in spring mechanisms 22A and 22B provides greater support for each individual spring of each spring mechanism 22A and 22B and consequently avoids an oscillatory spring system that can cause instability. Moreover, by trapping parallel springs 23A and 23B and parallel springs 24A and 24B in slots 26, as compared to coupling parallel springs to posts 18A and 18B inside of slots 26, greater friction, and thus energy dissipation, results between parallel springs due to the greater freedom of movement provided to the parallel springs, yet the parallel configuration of the springs still provides enough support to prevent instability.

Also present in FIGS. 2A and 2B is over-center stop 28A (post 18B also has over-center stop 28B as visible in FIG. 1). Generally, under normal flow conditions spring mechanisms 22A and 22B will stop rotation of flappers 14A and 14B respectively without flappers 14A and 14B coming into contact with any other component of valve 10. However, depending on the application of valve 10, the design of spring mechanisms 22A and 22B (i.e. a spring constant of spring mechanisms 22A and 22B), and the weight of flappers 14A and 14B, there can be maximum fluid flow velocity through valve 10 which rotates flappers 14A and 14B at a velocity great enough such that rotation of flappers 14A and 14B is not completely stopped solely by spring mechanisms 22A and 22B.

In such instances, over-center stop 28A can be included on post 18A. Over-center stop 28A protrudes out from post 18A in a direction parallel to hinge pin 16. Over-center stop 28A can act as a fail-safe structure for maximum fluid flow conditions. As flappers 14A and 14B deflect spring mechanisms 22A and 22B and energy is absorbed, a velocity of flappers 14A and 14B is substantially reduced. However, if springs 22A and/or 22B do not bring flappers 14A and/or 14B to a complete stop, flappers 14A and/or 14B proceed to come into contact with over-center stop 28A. In the illustrated embodiment, both ridge $15A_2$ of flapper 14A and ridge $15B_2$ of flapper 14B come into contact with over-center stop 28A (ridge $15A_3$ of flapper 14A and ridge $15B_3$ of flapper 14B come into contact with over-center stop 28B, shown in FIG. 1). Thus, the locations where flappers 14A and 14B contact over-center stop 28A are spaced from the location where flappers 14A and 14B contact spring mechanisms 22A and 22B. By the time flapper 14A and/or 14B comes into contact with over-center stop 28A the velocity of flapper 14A and/or 14B has been substantially reduced by spring mechanisms 22A and/or 22B such that an impact load on flapper 14A and 14B is minimal. Over-center stop 28A then provides a fail-safe structure for bringing flapper 14A and/or 14B to a complete stop (i.e. terminating rotation) under maximum flow conditions. In one embodiment, as illustrated for example in FIG. 2B, a portion of over-center stop 28A can be angled to correspond to an angle of flapper 14A and/or 14B (i.e. an angle of ridge $15A_2$ and/or $15B_2$) at or near a maximum open position. By angling over-center stop 28A as described, flapper 14A and/or 14B can be made to rest on over-center stop 28A (via ridges $15A_2$ and $15B_2$) when at or near a maximum open position.

In various applications, fluid flow volume and velocity will differ as will a size and density of flappers 14A and 14B. As these variables change from one application to another, so too does a rotational velocity of flappers 14A and 14B, necessitating a spring constant of spring mechanisms 22A and 22B sufficient for reducing and/or terminating a rotational velocity of flappers 14A and 14B (and thus preventing high impact loads on flappers 14A and 14B) in the particular application. To accommodate various applications of valve 10, spring mechanisms 22A and 22B can be altered to achieve an optimal spring constant for the particular application. By optimizing a spring constant of a spring mechanism for a specific application, flappers 14A and 14B are no longer imparted with significant stresses and as a result can be made from lower strength, less costly materials. For example, instead of using flappers 14A and 14B made of Inconel alloys, flappers 14A and 14B can be made of a 300 series stainless steel to achieve a cost savings.

Figure 3:
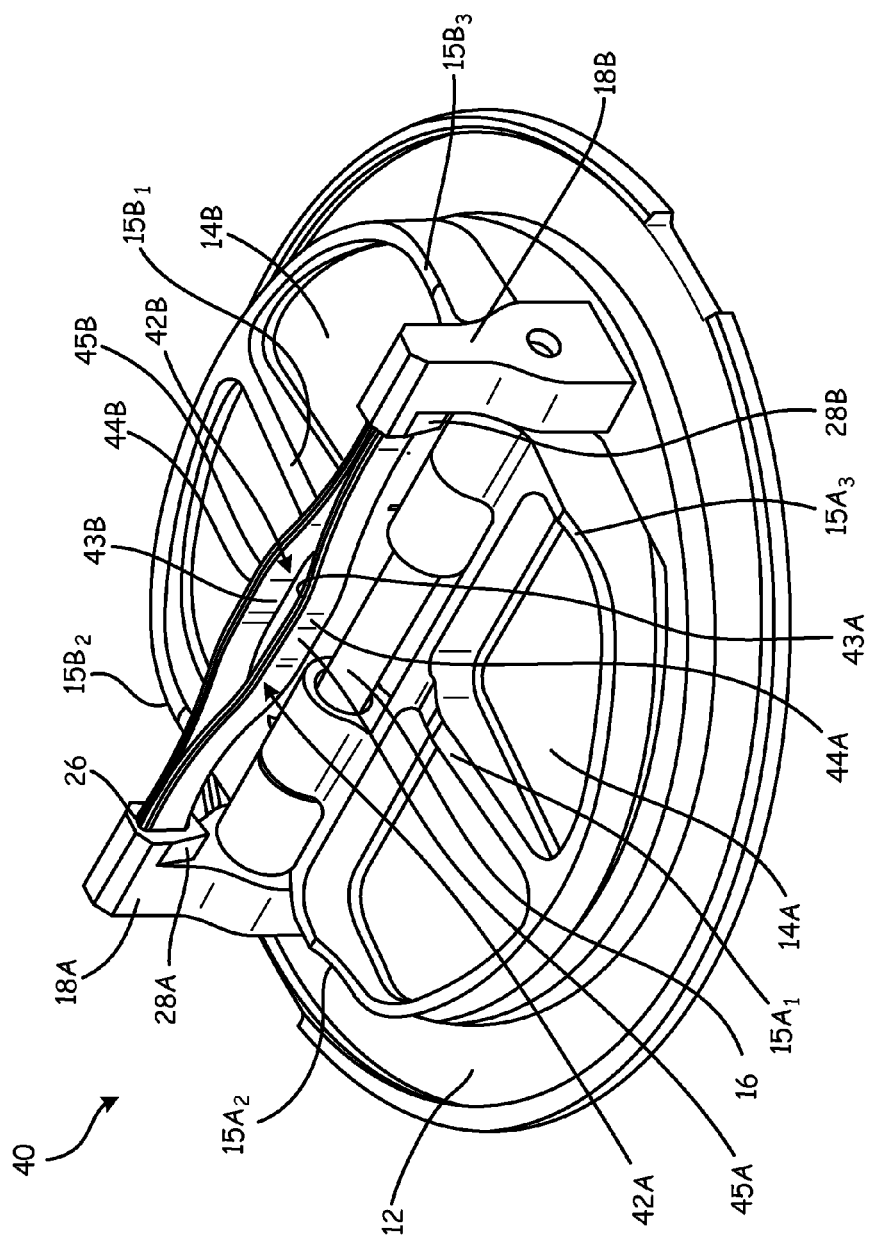
FIG. 3 is a perspective view of another embodiment of a swing check valve.

Referring to FIG. 3, a perspective view of another embodiment of swing check valve 40 is shown. Valve 40 differs from valve 10 in that spring mechanisms 42A and 42B of valve 40 have a greater spring constant than spring mechanisms 20A, 20B, 22A and 22B of FIGS. 1, 2A, and 2B. Spring mechanisms 42A and 42B are each two springs in parallel—spring mechanism 42A includes springs 43A and 44A in parallel, while spring mechanism 42B includes springs 43B and 44B in parallel. By using multiple springs 43A and 44A in parallel, a spring constant of spring mechanism 42A is doubled compared to a spring constant where only a single spring is utilized (e.g. spring mechanism 20A in FIG. 1). Thus, the use of multiple springs 43A and 44A in parallel is particularly advantageous where flapper 14A is heavy and/or has a high rotational velocity. Furthermore, the spring constant of spring mechanisms 42A and 42B is increased due to the geometry of spring mechanisms 42A and 42B. Altering spring mechanism geometry can result in a different spring constant. As compared to spring mechanisms 20A, 20B, 22A and 22B of FIGS. 1, 2A, and 2B, spring mechanisms 42A and 42B have axially elongated protrusion portions 45A and 45B (i.e. portion of spring mechanisms 42A and 42B which protrudes radially outward relative an axis extending between posts 18A and 18B). Portions 45A and 45B protrude outward into a path of rotation of flapper 14A and 14B respectively. This shape of spring mechanisms 42A and 42B increases the spring constant and optimizes spring mechanisms 42A and 42B for an application of valve 40 where, for example, flappers 14A and 14B are heavy and/or have a high rotational velocity due to a greater fluid flow velocity and/or volume.

Figure 4:
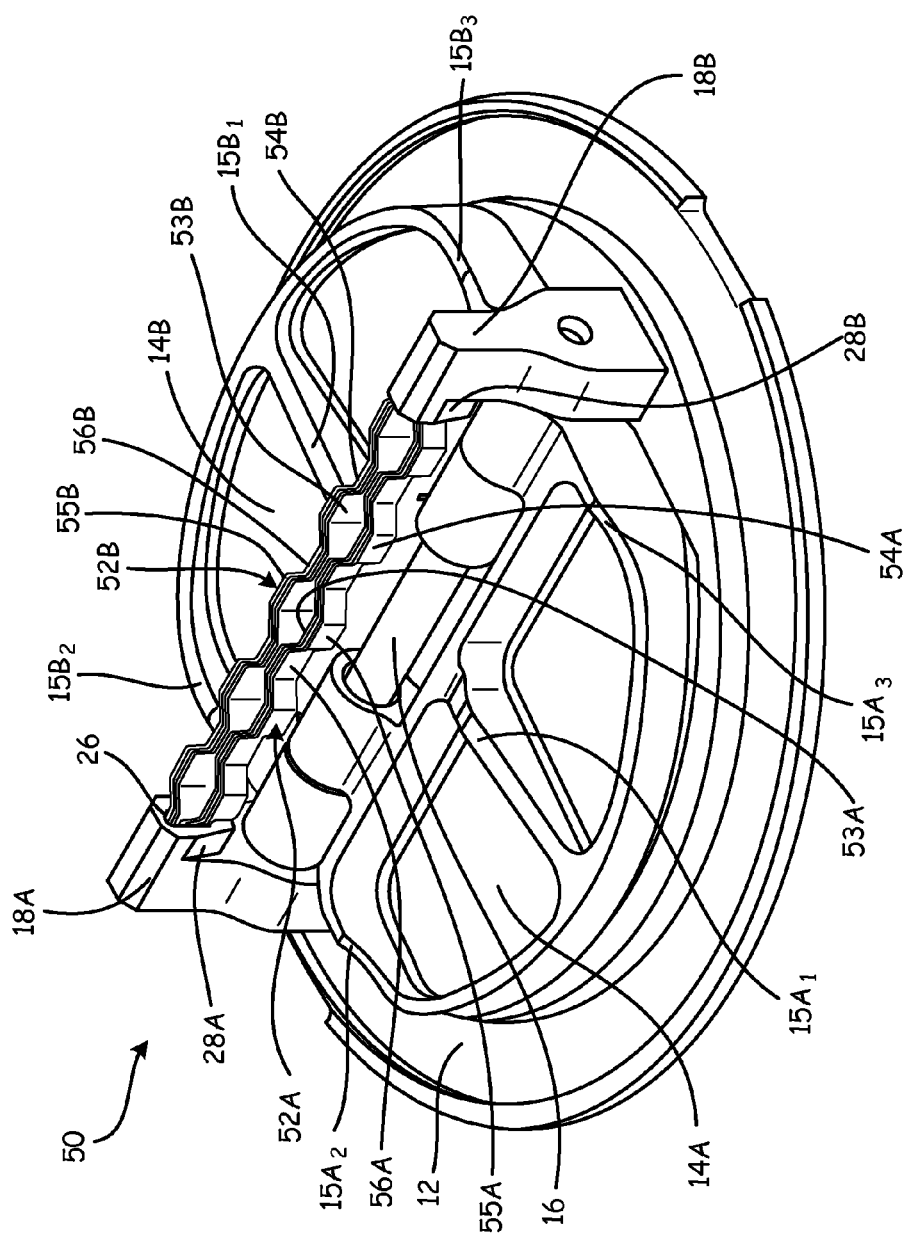
FIG. 4 is a perspective view of a further embodiment of a swing check valve.

FIG. 4 is a perspective view of a further embodiment of swing check valve 50. Valve 50 differs from valve 40 in that spring mechanisms 52A and 52B have a different geometry. Spring mechanism 52A includes generally corrugated springs 53A and 54A in parallel, and spring mechanism 52B includes generally corrugated springs 53B and 54B in parallel. Springs 53A and 54A as well as springs 53B and 54B are generally corrugated in shape because springs 53A and 54A have alternating protruding portions 55A and indented portions 56A and springs 53B and 54B also have alternating protruding portions 55B and indented portions 56B. Spring mechanisms 52A and 52B have a greater spring constant than spring mechanisms 20A, 20B, 22A, and 22B, but a spring constant substantially equivalent to that of spring mechanisms 42A and 42B. Thus, spring mechanism 52A and 52B can be suited for applications of valve 50 where flappers 14A and 14B are heavy and/or have a high rotational velocity due to a greater fluid flow velocity and/or volume.

In addition to altering spring mechanism geometry and/or using multiple springs in parallel as a spring mechanism, a spring constant of a spring mechanism can be optimized for a particular application by varying the length, height, and thickness of a spring mechanism. Thus, virtually limitless spring mechanism configurations can be considered to optimize a spring mechanism for a specific application. Moreover, by trapping springs between posts 18A and 18B springs suitable for one application can be easily switched out for different springs suitable for another application, providing a modular assembly which can easily be optimized for various applications.

In other embodiments, a spring mechanism can be optimized, for instance, by using three of more springs in parallel, and springs other than leaf type springs can be used. Other possible spring mechanism designs can include, for example, two or more springs in series. Springs are in series when springs are configured as a mirror image of each other (i.e. flipping one of two springs in parallel 180°). Springs in series result in a lower spring constant than springs in parallel, and thus springs in series can be suited for valve applications where the flappers are lighter and/or have a lower rotational velocity.

DISCUSSION OF POSSIBLE EMBODIMENTS

The following are non-exclusive descriptions of possible embodiments of the present invention.

A check valve comprising a housing; a first flapper rotatable about an axis between open and closed positions; and a first spring mechanism operatively positioned between a static component and the first flapper, wherein when the first flapper is in the closed position there is a distance between the first spring mechanism and either the static component or the first flapper.

The check valve of the preceding paragraph can optionally include, additionally and/or alternatively, any one or more of the following features, configurations and/or additional components:

A first post and a second post included on the housing, with the axis about which the first flapper is rotatable extending between the first post and the second post.

An over-center stop on at least one of the first post and second post.

The over-center stop is angled to correspond to the first flapper at or near a maximum open position.

The first spring mechanism comprises multiple springs in parallel.

The first spring mechanism is made of a metallic material.

A second flapper rotatable about an axis between open and closed positions; and a second spring mechanism operatively positioned between a static component and the second flapper, wherein when the second flapper is in the closed position there is a distance between the second spring mechanism and either the static component or the second flapper.

A first post and a second post included on the housing; and an over-center stop on at least one of the first post and second post.

The over-center stop is angled to correspond to the second flapper at or near a maximum open position.

The second spring mechanism comprises multiple springs in parallel.

The second spring mechanism is made of a metallic material.

A method for stopping rotation of a flapper of a check valve, the method comprising: rotating a first flapper from an interface of the first flapper and a housing of the check valve; and decreasing a rotational velocity of the first flapper by deflecting a first spring mechanism with the first flapper at or near a location where the first flapper is desired to stop rotating.

The method of the preceding paragraph can optionally include, additionally and/or alternatively, the following techniques, steps, features and/or configurations:

Deflecting the first spring mechanism with the first flapper comprises deflecting multiple springs in parallel.

Rotating a second flapper from an interface of the second flapper and the housing of the check valve; and decreasing a rotational velocity of the second flapper by deflecting a second spring mechanism with the second flapper at or near a location where the second flapper is desired to stop rotating.

Terminating rotation of at least one of the first flapper and second flapper by contacting the at least one of the first flapper and second flapper with an over-center stop such that the at least one of the first flapper and second flapper rests against the over-center stop.

Any relative terms or terms of degree used herein, such as "generally", "substantially", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A check valve comprising:
    a housing;
    a first flapper rotatable about an axis between open and closed positions;
    a first post and a second post included on the housing, wherein the axis about which the first flapper is rotatable extends between the first post and the second post;
    an over-center stop on at least one of the first post and second post;
    a first spring mechanism operatively positioned between a static component and the first flapper, wherein when the first flapper is in the closed position there is a distance between the first spring mechanism and either the static component or the first flapper;
    a second flapper rotatable about the axis between the open and closed positions; and
    a second spring mechanism operatively positioned between the static component and the second flapper, wherein when the second flapper is in the closed position there is a distance between the second spring mechanism and either the static component or the second flapper,
    wherein the first spring mechanism and the second spring mechanism are springs parallel to one another.

2. The check valve of claim 1, wherein the over-center stop is angled to correspond to the first flapper at or near a maximum open position.

3. The check valve of claim 1, wherein the first spring mechanism comprises multiple springs in parallel.

4. The check valve of claim 1, wherein the first spring mechanism is made of a metallic material.

5. The check valve of claim 1, wherein the over-center stop is angled to correspond to the second flapper at or near a maximum open position.

6. The check valve of claim 1, wherein the second spring mechanism is made of a metallic material.

7. A method for stopping rotation of a flapper of a check valve, the method comprising:
    rotating a first flapper from an interface of the first flapper and a housing of the check valve;
    decreasing a rotational velocity of the first flapper by deflecting a first spring mechanism with the first flapper at or near a location where the first flapper is desired to stop rotating, wherein the first spring mechanism is multiple springs in parallel;
    rotating a second flapper from an interface of the second flapper and the housing of the check valve; and
    decreasing a rotational velocity of the second flapper by deflecting a second spring mechanism with the second flapper at or near a location where the second flapper is desired to stop rotating.

8. The method of claim 7, further comprising:
    terminating rotation of at least one of the first flapper and second flapper by contacting the at least one of the first flapper and second flapper with an over-center stop such that the at least one of the first flapper and second flapper rests against the over-center stop.

* * * * *